United States Patent [19]

Wouters et al.

[11] Patent Number: 5,681,629
[45] Date of Patent: Oct. 28, 1997

[54] PROCESS FOR THE MANUFACTURE OF AN ARTICLE COMPRISING A SURFACE TREATMENT STEP IN THE SUBSTANTIAL ABSENCE OF OXYGEN

[75] Inventors: Paul Wouters, Vilvoorde; Jules-Joseph Van Schaftingen, Wavre; Philippe Dugois; Marc Obsomer, both of Brussels, all of Belgium

[73] Assignee: Solvay (Société Anonyme), Brussels, Belgium

[21] Appl. No.: 350,975

[22] Filed: Nov. 29, 1994

[30] Foreign Application Priority Data

Dec. 2, 1993 [BE] Belgium ............................... 09301331
Mar. 21, 1994 [BE] Belgium ............................... 09400303

[51] Int. Cl.$^6$ .................................................. B29C 49/46
[52] U.S. Cl. .......................... 428/36.6; 264/83; 264/526; 220/581; 220/905; 206/524.1
[58] Field of Search ........................... 264/83, 526, 529, 264/528; 428/36.6; 220/581, 905; 206/524.1

[56] References Cited

U.S. PATENT DOCUMENTS

| | | |
|---|---|---|
| 4,264,750 | 4/1981 | Anand et al. . |
| 4,422,991 | 12/1983 | Phillips . |
| 4,869,859 | 9/1989 | Eschwey et al. . |

FOREIGN PATENT DOCUMENTS

| | | |
|---|---|---|
| 270 776 | 6/1988 | European Pat. Off. . |
| 1 520 915 | 6/1969 | Germany . |
| 1 055 308 | 1/1967 | United Kingdom . |
| 2 001 656 | 2/1979 | United Kingdom . |

OTHER PUBLICATIONS

Clark, D.T. et al., "Applications of ESCA to Polymer Chemistry. Part VI. Surface Fluorination of Polyethylene Application of ESCA to the Examination of Structure as a Function of Depth," *Journal of Polymer Science: Polymer Chemistry Edition*, vol. 13, pp. 857–874 (1975).

*Primary Examiner*—Charles Nold
*Attorney, Agent, or Firm*—Spencer & Frank

[57] ABSTRACT

The invention relates to a process for the manufacture of an article comprising a surface treatment step of at least part of the article in the substantial absence of oxygen; the surface of the article which is to be treated consists of a material which comprises at least one polyolefin and which contains less than 5 mg of oxygen per kg (no account being taken of the optional additives).

17 Claims, No Drawings

PROCESS FOR THE MANUFACTURE OF AN ARTICLE COMPRISING A SURFACE TREATMENT STEP IN THE SUBSTANTIAL ABSENCE OF OXYGEN

FIELD OF THE INVENTION

The present invention relates to a process for the manufacture of an article which is impervious in particular to fuels, comprising a step of surface treatment of at least part of the article in the substantial absence of oxygen.

TECHNOLOGY REVIEW

It is well known to use metals as materials for the manufacture of impermeable articles, particularly of articles which are impervious to fuels, such as pipes, films or containers. Nowadays, plastics have numerous advantages over metallic materials, especially the greater corrosion-resistance and impact strength thereof, their low weight, the possibility of imparting very varied forms thereto, etc. However, most of the common plastics, and in particular polyolefins, have the drawback of not being totally impervious to certain organic substances, and especially to certain constituents present in liquid fuels. On account of this drawback, and also because of the increasingly strict regulations especially regarding fuel tanks for motor vehicles, it is essential to have available plastics which, while remaining inexpensive to produce, are highly impervious to fuels.

It has already been proposed to produce multi-layer articles comprising at least one layer of a plastic which has a good level of impermeability to fuels, for example a polyamide, as well as at least one layer of a common plastic, such as a polyolefin, which is intended to provide these articles with mechanical strength. Such an approach is, however, complex and expensive to implement.

Another proposed solution, described especially in the document EP 500166, consists in subjecting to a surface treatment at least part of the articles to be made impermeable for example to a fluorination or a sulphonation treatment. This technique leads to a considerable increase in the impermeability of the polyolefins towards hydrocarbons, but the level of impermeability is not always sufficient, particularly in the case of articles made of polyolefins which are desired to be made sufficiently impervious to mixed fuels comprising oxygenated constituents such as methanol.

In addition, it is clear that the approaches adopted should not prejudice the requirements relating to the use of plastics. Thus, by way of example, the polyolefins used to produce, via extrusion blow-moulding, hollow bodies such as fuel tanks should preferably have good heat stability and suitable properties of viscosity, molten behaviour and extensibility.

Other requirements are associated with certain specific uses of the articles; thus, for example, certain standards relating to the impermeability of plastic fuel tanks should be met, not only immediately after their manufacture but also after an extended period of use. The reason for this is that the thermal and mechanical stresses associated with an actual use, such as the displacement of the liquid in contact with the article, may gradually reduce the impermeability of the articles towards the fuels. A particularly stringent method of evaluating the resistance of fuel tanks to such thermal and mechanical stresses is to perform a so-called "slosh test" as described hereinbelow. After this test, the impermeability towards fuels of certain tanks made of polyethylene is reduced by a factor which may exceed 10.

SUMMARY OF THE INVENTION

Consequently, the object of the present invention is to enable the manufacture of articles whose impermeability in particular to fuels is high, stable with time and little affected by thermal and mechanical stresses. In particular, the invention aims to enable the manufacture of fuel tanks which satisfy the above-mentioned "slosh test".

DETAILED DESCRIPTION OF THE INVENTION

The invention relates to a process for the manufacture of an article comprising a surface treatment step of at least part of the article in the substantial absence of oxygen, which is characterized in that the surface layer of the article which is to be treated consists of a material which comprises at least one polyolefin and which contains less than 5 mg of oxygen per kg, independently of the oxygen which may be contained in the optional additives incorporated into this material.

The articles concerned may be of any type, for example films, plates, hollow bodies, pipes, etc. The invention is advantageous in the case of hollow bodies. It is most particularly advantageous in the case of fuel tanks. The materials constituting the articles or article parts concerned comprise at least one polyolefin as defined below. They may possibly comprise several of these polyolefins. They preferably consist essentially of a single polyolefin. Depending on the destination or the function of a given article, for example depending on the position of the contact zones between the fuels and the article, it is especially possible to choose to make only one part or only certain parts out of a material corresponding to the definition given above and then to surface-treat only this part of the article. It is possible, for example, to manufacture an article for which the surface layer intended to be treated according to the invention consists of a material which comprises at least one polyolefin. It is thus possible by coextrusion to manufacture a two-layer article the inner layer of which consists of such a material which comprises at least one polyolefin and is surface-treated, and another layer of which comprises one or more different plastics as well as one or more optional additives. In the case of multilayer hollow bodies, it is preferred for at least the inner layer thereof essentially to consist of a material comprising a polyolefin and to contain less than 5 mg of oxygen per kg, independently of the oxygen which may be contained in the optional additives incorporated into this material.

The material which comprises at least one polyolefin usually consists essentially of polyolefin. The term polyolefin is understood to denote any olefin homopolymer or copolymer and any copolymer comprising at least 70% of olefinic monomers or mixtures thereof. The term olefin is understood to refer both to α-olefins such as ethylene, propylene, hexene or butene and to olefins containing more than one double bond, for example di-olefins such as butadiene. The polyolefin preferably used is polyethylene, this term denoting any ethylene polymer possibly comprising, besides ethylene, less than 10% (by weight) of other copolymers such as, for example, butene and/or hexene. In a particularly preferred manner, the polyolefin used is high density polyethylene, the density of which is generally between 935 and 965 kg/m$^3$ at 23° C. (ISO R1183).

The material may additionally comprise certain known additives such as fillers, pigments, antioxidants, anti-UV agents, lubricants, reinforcing fibres, flame retardants, etc. Advantageously, these additives are not polymers. It is preferable for the material to contain as few additives as possible, preferably less than 0.2% by weight. The presence of antioxidants, especially phenolic, organophosphorus or organosulphur antioxidants, in amounts which preferably do not exceed 0.1% by weight is, however, accepted.

The oxygen content of the material comprising the polyolefin used is preferably less than 3 mg of oxygen per kg. In a particularly preferred manner, it is less than 1 mg of oxygen per kg.

As outlined above, the maximum oxygen content of the material does not include the oxygen which may be present in the additive or additives which may be incorporated into the material. The aim, in fact, is to limit the amount of oxygen which is incidentally present, for example of the oxygen which is trapped between the polyolefin granules during the manufacture of the article, of the oxygen which is dissolved in the material, or alternatively of the oxygen which may have become chemically bonded to the polyolefin by oxidation during the processing thereof. On the other hand, the oxygen which is indirectly present in the material following the optional incorporation of additives containing it should not be taken into account, in order to comply with the maximum contents mentioned.

The term surface treatment is understood to denote any known treatment of the surface for the purpose of increasing the impermeability. Surface treatments which enable the impermeability of tanks towards fuels to be increased are particularly advantageous here. Use may advantageously be made of sulphonation or fluorination. Excellent results have been obtained by a fluorination treatment.

This surface treatment may consist especially in exposing all or part of the article, for a period which is generally of the order of a few seconds to several hours, to the action of a gaseous mixture comprising a reactive gas and an inert gas such as nitrogen.

The term "substantial absence of oxygen" is understood to mean that the oxygen content in the gas to which the polyolefin may be exposed is very low, that is to say less than 100 ppm by volume, and preferably less than 10 ppm by volume.

The manufacturing process may also comprise, besides the abovementioned surface treatment step, a prior step of processing of the article.

The term processing step is understood to denote any known technique which may be used for the conversion of thermoplastics, enabling an article to be created. By way of non-limiting examples of a processing step, there may for example be mentioned injection moulding, extrusion, extrusion blow-moulding, calendering, etc. It is preferred to perform a step of extrusion blow-moulding as the prior processing step, especially in the case of hollow bodies.

It is not excluded, by the process according to the invention, for the material to have contained, at any given stage in the processing step, an amount of oxygen greater than 5 mg/kg, provided that the oxygen content has become less than this value before the surface treatment step.

However, it is preferred for the material used always to have contained less than 5 mg of oxygen per kg. It is also preferred to avoid a substantial increase in the oxygen content of the material during the processing step. The reason for this is that during and immediately after the processing of the material, it is at a high temperature and is thus particularly sensitive to the presence of oxygen, which would become chemically bonded or would become dissolved to a greater extent, and would thereby entail the risk of imposing an additional step before the surface treatment in order to reduce the oxygen content of the material to the value required according to the invention.

Consequently, the processing step is very advantageously performed in the substantial absence of oxygen, as regards at least the part of the article which is intended to be surface-treated. To do this, it is possible, for example, to work under vacuum or under an inert atmosphere. The term inert atmosphere is understood to denote an atmosphere consisting of one or more inert gases, for example such as nitrogen.

The case of extrusion blow-moulding is particularly intricate, since after leaving the extruder, while it is still at a high temperature, the extruded parison is liable to remain suspended under the extruder head for a relatively long time, which may range from a few seconds to a few minutes. It is thus essential to minimize any risk of contact between the parison (or at least the part thereof intended to be surface-treated) and the ambient air, between the exiting of the parison from the extruder and the closing of the mould. In the case where the articles manufactured are small in size, it may be envisaged to place the whole processing apparatus into a chamber which is under vacuum or under an inert atmosphere. It is, however, difficult to apply this solution in an industrial environment, and particularly in the case of extrusion blow-moulding apparatus which is intended for the manufacture of fuel tanks, these generally being large in size.

Injection moulding poses few problems: it is easy to fill the mould with an inert gas before beginning injection moulding, so as to flush out the air.

In the cases where an article is manufactured by extrusion or extrusion blow-moulding for which at least the inner wall of the article consists of a material containing a polyolefin and containing less than 5 mg of oxygen per kg, one solution consists in diluting and replacing as much as possible of the air which is present in the cavity of the article being extruded by means of a stream of inert gas which is injected into the centre of the parison, for example by means of an orifice which is provided in the central zone of the extrusion head and which is connected to a source of inert gas. The inert gas flow rate is usually adjusted so that the oxygen content in the cavity of the article being extruded is less than 100 ppm by volume, and preferably less than 10 ppm by volume. In order to reduce the consumption of inert gas, it is advantageously possible to obturate, at least partially, the end of the article being extruded. In the case of the extrusion, it is especially possible to position a stopper at its end, the said stopper possibly containing a small orifice so as to enable the inert gas injected into the extrusion head gradually to expel thereby the traces of air trapped in the cavity of the article being extruded. Rather than using a stopper which has been specially designed for this purpose, it is also possible to pinch the end of the extruded article so as to give the end thereof an airtight or virtually airtight seal, leading to the same result. It is, of course, necessary to see to it that the pressure of the inert gas injected into the article is carefully controlled, in order to prevent an internal positive pressure or negative pressure from causing a deformation of the article being manufactured. The sealing technique is particularly advantageous in the case of extrusion blow-moulding, where the stopper technique is inefficient and impractical on account of the discontinuous nature of the process. Via this technique, it is possible to reach an oxygen content in the cavity of the article of less than or equal to 2 ppm by volume.

In the case of extrusion blow-moulding, it is possible to obtain an even greater elimination of the residual oxygen which would have been trapped in the cavity of the parison after closing of the mould, by performing several injections of blowing gas, separated by at least partial depressurizations, so as to dilute the trapped oxygen.

According to a particularly advantageous embodiment of the manufacturing process, the processing step is performed in the substantial absence of oxygen.

It is additionally advantageous that the steps of the manufacturing process should for the best be integrated consecutively, in order to reduce especially the time wasted and the risk of uptake of oxygen by the material between the said steps. It is especially advantageous for the processing step to be immediately followed by the surface treatment step. In the specific case of processing via extrusion blow-moulding, it may prove very advantageous to perform the surface treatment immediately after the blow-moulding, for example by injecting the surface treatment gas into the blowing mould.

Before the processing and the surface treatment of the article, the manufacturing process may additionally comprise a step of conditioning of the material comprising the polyolefin. The term "conditioning step" is understood to denote any step intervening between the moment when the polyolefin leaves the synthesis (polymerization) reactor and that when the material containing it will be processed.

By way of non-limiting examples, the conditioning step may comprise one or more of the following treatments: transportation, storage, compacting, granulation, supplying of the processing machine, etc.

It is not excluded by the process according to the invention for the material to have contained, at any stage in the conditioning step, an amount of oxygen greater than 5 mg/kg, provided that the oxygen content becomes less than this value before the surface treatment step and, as mentioned above, preferably even before the processing step.

Nevertheless, it is preferred to avoid a substantial increase in the oxygen content of the material during the conditioning step, which would entail the risk of imposing an additional step before the surface treatment, in order to reduce the oxygen content of the material to the value required according to the invention. By way of illustration, the simple act of supplying polyethylene powder or granules to an extruder without any particular precautions entrains a large amount of air into the entry zone of the extruder, such that the oxygen content prevailing in the entry zone of the extruder (in the material) is commonly of the order of 300 mg/kg.

Consequently, the conditioning step is performed as much as possible in the substantial absence of oxygen. In order to do this it is possible, for example, to work under vacuum or under an inert atmosphere.

As regards the transportation, it is especially possible to maintain the fluff (that is to say the polymer powder leaving the polymerization reactor) under vacuum or under an inert atmosphere from the moment it leaves the polymerization reactor. It is possible, for example, to use a transportation system which is maintained under vacuum or under an inert atmosphere. The term transporation system is understood to denote any common device for handling powders or granules, such as an Archimedes screw, a conveyor belt, etc. In order that the penetration of oxygen into this device may be optimally prevented, it is preferable for it to be as airtight as possible.

As regards the storage, it is especially possible to keep the polyolefin in airtight packages, in particular in packages under vacuum or containing an inert gas.

If it proves difficult, for material reasons or otherwise, to perform the conditioning step described above in the substantial absence of oxygen, it is advantageous, or sometimes even necessary, to add a step the main aim of which is to reduce the oxygen content of the material before its processing. In order to do this, the material is placed under an inert atmosphere or, preferably, under vacuum, at a temperature below its melting point $T_m$, preferably of from $T_m-10°$ C. to room temperature. This additional treatment advantageously lasts at least 10 seconds, preferably at least 1 hour. In the particular case of polyethylene, the temperature is preferably of the order of 20° to 100° C. and the duration is preferably of the order of 15 seconds to 2 hours.

If there is concern regarding the material coming into contact with air, it is also advantageous to saturate it with inert gas, for example by exposing it to at least one inert gas at a pressure which is slightly above atmospheric pressure, at a temperature of from $T_m-10°$ C. to room temperature and for a period of at least one minute. This enables the oxygen uptake by the material to be substantially reduced, even if it is subsequently exposed to air by accident.

The research carried out by the Applicant has shown that the materials comprising polyolefins, for example polyethylene, which have hitherto been used for the manufacture of surface-treated articles which are to be made impervious in particular to fuels possess a non-negligible oxygen content which can especially be trapped within micro-cavities, dissolved in the plastic itself or chemically bonded thereto (oxidation). The Applicant has observed, without arriving at an explanation thereof, that an excessive presence of oxygen in a material during the surface treatment step leads, surprisingly, to rapid deterioration of the impermeability of the surface-treated finished articles comprising this material, when they are subjected to considerable thermal and mechanical stresses such as those defined above (cf. "slosh test").

On the other hand, the Applicant has observed that the use, in accordance with the invention, of an oxygen-poor material during the suitable surface treatment step has a synergistic effect which leads to impermeability levels which are very high, in particular towards fuels, which are stable with time and which are little affected by thermal and mechanical stresses.

Consequently, the invention also relates to the use of a material comprising at least one polyolefin and containing less than 5 mg of oxygen per kg, independently of the oxygen which may be contained in the optional additives incorporated into this material, for the manufacture of a material at least part of the surface layer of which is intended to be treated in the substantial absence of oxygen.

Another aspect of the invention relates to an article at least part of which is intended to be surface-treated in the substantial absence of oxygen, which is characterized in that the surface layer which is to be treated consists of a material which comprises at least one polyolefin and contains less than 5 mg of oxygen per kg, independently of the oxygen which may be contained in the optional additives incorporated into this material.

Finally, the invention relates to a fuel tank consisting essentially of high density polyethylene which has undergone a surface fluorination treatment, which is characterized by a permeability after the "slosh test" not exceeding 0.2 gram CARB, preferably less than 0.1 gram CARB. The permeability is measured according to SHED procedure defined by the Californian Air Resource Board (CARB) in "Technical support document for a proposal to amend regulations regarding evaporative emission standards, test procedures and durability requirements applicable to passenger cars, light-duty trucks, medium-duty vehicles and heavy-duty vehicles" dated 9 Aug. 1990.

EXAMPLE

Examples 1R, 2R and 3R are given for comparison. Example 4 illustrates the invention, in a non-limiting manner.

Fuel tanks essentially consisting of high density polyethylene (HDPE), with an internal volume of 0.075 m³ and with an average thickness of 4.5 mm, were produced by extrusion blow-moulding. The HDPE used was of the PHILLIPS HDPE type with a density of 0.946, provided in the form of a compacted powder with a melt index of 5.7 g/10 min (measured according to ASTM standard D 1238) under a load of 212 N and at 190° C. This HDPE was polymerized in a standard manner and without being conditioned under vacuum or in an inert atmosphere as soon as it left the reactor. 1 g/kg of the antioxidant Irganox® 1076 was added thereto.

The extrusion of this material was performed in a standard manner, for the purpose of manufacturing fuel tanks, in a continuous extrusion head consisting of a single screw with a grooved sheath, the parison being formed in a cycle time of 150 seconds and the head exit temperature being about 200° C.

4 tests were performed, in which one or more of the following steps were applied, as indicated in the table featured below:

(A) Before extrusion blow-moulding, the material was conditioned under vacuum at 80° C. for 2 hours, then saturated with nitrogen at 80° C. and at 1.05 bar for 15 minutes, and then placed in an airtight container under a nitrogen atmosphere at 20° C. and at 1.05 bar.

(B) The supply hopper of the extruder was maintained under a flush of nitrogen.

(C) The lower end of the parison was sealed and the parison inflated with nitrogen, at a pressure of 1.05 bar. The oxygen content in the parison cavity was 2 ppm by volume.

(D) Blow-moulding of the parison comprised the following steps:
— an actual blow-moulding, comprising 4 cycles of injection lasting 6 seconds each and of depressurization lasting 4 seconds each, using nitrogen, at a maximum pressure of 12 bar;
— a phase of in-line fluorination, comprising 3 cycles of injection (6 s) and of depressurization (4 s) using a gaseous mixture containing 2% of fluorine and 98% of nitrogen by volume, at a maximum pressure of 10 bar; the fluorine consumption being about 30 g per tank;
— a rinsing of the tank with nitrogen (4 cycles of injection (5 s) and of depressurization (5 s)).

In each of the 4 tests, the permeability towards fuel was measured according to the CARB procedure before and after application of the "slosh test"; these values are featured in the table below, expressed in grams CARB. The fuel used was a CEC RF-08-A-85 petrol. The oxygen content in the material (no account being taken of the antioxidant) before the fluorination step and the maximum oxygen content in the cavity of the parison during the processing step were also measured.

TABLE

| | | Steps | | | Permeability | | $O_2$ content in the material before fluorination | Max. $O_2$ content in the cavity of the parison during processing |
|---|---|---|---|---|---|---|---|---|
| Test | A | B | C | D | before "slosh test" | after "slosh test" | | |
| 1R | No | No | No | Yes | <0.1 | >1 | ≧20 mg/kg | ≦500 ppm |
| 2R | Yes | Yes | No | Yes | <0.05 | 0.7 | ≧10 mg/kg | ≦500 ppm |
| 3R | No | Yes | Yes | Yes | <0.05 | 0.5 | ≈10 mg/kg | ≦2 ppm |
| 4 | Yes | Yes | Yes | Yes | <0.03 | <0.1 | <1 mg/kg | ≦2 ppm |

The "slosh test" used comprises the following steps:
— filling of the tank to 40% of its capacity and leak-tight closing of all the orifices thereof, except for an orifice used for placing at atmospheric pressure;
— storage for 20 weeks at 40±2° C., the inside of the tank being at atmospheric pressure via a canister;
— securing of the tank onto an oscillating chassis such as one mounted on a vehicle, and also with ventilation through a canister of activated charcoal;
— the tank undergoes 1,000,000 cycles, the characteristics of which are:
— frequency of 12 cycles per minute, without interruption;
— oscillations of +15° to −15° relative to the horizontal;
— temperature of 40±2° C.;
— storage for 8 weeks at 40±2° C.;
— measurement of the permeability according to the CARB procedure.

What is claimed is:

1. A process for the manufacture of an article impervious to fuel, comprising a surface treatment step of at least part of the article in the presence of less than 100 ppm by volume of oxygen, wherein the surface layer of the article which is to be treated consists of a material which comprises at least one polyolefin containing less than 5 mg of oxygen per kg.

2. The process according to claim 1, wherein the article is a hollow body.

3. The process according to claim 2, wherein the hollow body is a fuel tank.

4. The process according to claim 1, wherein the polyolefin is high density polyethylene.

5. The process according to claim 1, wherein the surface treatment is a fluorination treatment.

6. The process according to claim 1 wherein the material constituting the surface layer consists essentially of polyolefin.

7. The process according to claim 1, additionally comprising a prior step of processing of the article.

8. The process according to claim 7, wherein the prior processing step consists of an extrusion blow-moulding step.

9. The process according to claim 7, wherein the processing step is performed in the substantial absence of oxygen.

10. The process according to claim 7, additionally comprising a step of conditioning of the material comprising the polyolefin before its processing and the surface treatment of the article.

11. In an article of manufacture, the improvement comprising said article comprising a material produced by the process of claim 1, at least part of which is surface treated in a substantial absence of oxygen.

12. The article of manufacture according to claim 11, wherein the surface which is be treated consists of a material which comprises at least one polyolefin and contains less than 5 mg of oxygen per kg, independently of the oxygen which may be contained in the optional additives incorporated into this polyolefin.

13. In a fuel tank, the improvement comprising said fuel tank comprising a material manufactured according to the process of claim 1.

14. A process for the manufacture of an article impervious to fuel, comprising fluorinating a surface of at least part of the article in the presence of less than 100 ppm by volume of oxygen, said surface which is fluorinated consisting of high density polyethylene containing less than 5 mg of oxygen per kg.

15. The process according to claim 5, wherein said fluorination treatment is performed by using a gaseous mixture consisting essentially of gaseous nitrogen and gaseous fluorine.

16. The process according to claim 1, wherein said at least one polyolefin contains less than 1 mg of oxygen per kg.

17. A fuel tank manufactured by the process according to claim 1.

* * * * *